(12) United States Patent
Fall et al.

(10) Patent No.: US 8,236,176 B2
(45) Date of Patent: Aug. 7, 2012

(54) REPLACEABLE FILTER CARTRIDGE

(75) Inventors: Ronald E. Fall, Carmel, IN (US); John M. Ruddock, Westfield, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 425 days.

(21) Appl. No.: 12/432,076

(22) Filed: Apr. 29, 2009

(65) Prior Publication Data

US 2010/0025317 A1 Feb. 4, 2010

Related U.S. Application Data

(60) Provisional application No. 61/084,275, filed on Jul. 29, 2008.

(51) Int. Cl.
*B01D 29/15* (2006.01)

(52) U.S. Cl. ......... 210/232; 210/238; 210/450; 210/457

(58) Field of Classification Search ............... 210/232, 210/238, 437, 450, 457
See application file for complete search history.

(56) References Cited

U.S. PATENT DOCUMENTS

| | | | |
|---|---|---|---|
| 4,299,699 A | 11/1981 | Boogay | |
| 4,806,240 A | 2/1989 | Giordano et al. | |
| 5,035,797 A | 7/1991 | Janik | |
| 5,186,829 A | 2/1993 | Janik | |
| 5,609,757 A | 3/1997 | Schiavo et al. | |
| 5,645,718 A * | 7/1997 | Hardison et al. | 210/232 |
| 6,495,042 B1 | 12/2002 | Knight | |
| 6,506,302 B2 | 1/2003 | Janik | |
| 6,706,182 B2 * | 3/2004 | Schuyler | 210/237 |
| 7,022,228 B2 * | 4/2006 | Hennes et al. | 210/232 |
| 7,070,692 B2 | 7/2006 | Knight | |
| 7,182,864 B2 | 2/2007 | Brown et al. | |
| 7,326,342 B2 | 2/2008 | Richmond et al. | |
| 2005/0000876 A1 * | 1/2005 | Knight | 210/235 |
| 2006/0054547 A1 | 3/2006 | Richmond et al. | |
| 2008/0110811 A1 * | 5/2008 | Brown et al. | 210/120 |

FOREIGN PATENT DOCUMENTS

EP     0260069 A2 *   3/1988

* cited by examiner

*Primary Examiner* — Fred Prince
(74) *Attorney, Agent, or Firm* — Renner, Otto, Boisselle & Sklar, LLP

(57) ABSTRACT

A filter assembly wherein a housing seat (220) and a cartridge cap (330) are keyed to insure correct filter replacement procedures. The seat (220) can comprise a family of pedestals (270) and the end cap (330) can comprise a corresponding family of pedestal-insertion pockets (370). The correct filter cartridge can be easily installed (e.g., periodically replaced), by aligning the pockets (370) of the end cap (330) with the pedestals (270) in the housing seat (220), and inserting the pedestals (260) into the pockets (370).

18 Claims, 11 Drawing Sheets

REPLACEABLE FILTER CARTRIDGE

RELATED APPLICATION

This application claims priority under 35 U.S.C. §119 (e) to U.S. Provisional Patent Application No. 61/084,275 filed on Jul. 29, 2008. The entire disclosure of this provisional application is hereby incorporated by reference. If incorporated-by-reference subject matter is inconsistent with subject matter expressly set forth in the written specification (and/or drawings) of the present disclosure, the latter governs to the extent necessary to eliminate indefiniteness and/or clarity-lacking issues.

FIELD

A filter cartridge comprising an end cap adapted to accommodate periodic replacement of the cartridge within a housing.

BACKGROUND

A filter assembly can comprise a housing and a filter cartridge installed in the housing. The housing is usually considered a permanent part of the assembly, while the filter cartridge is intended to be periodically replaced. To this end, the filter cartridge can comprise an end cap, or other adjacent structure, that accommodates easy installation of the cartridge into the housing.

SUMMARY

A filter cartridge is provided wherein an end cap has pockets for receipt of keyed pedestals in a housing seat. If the pockets correspond to the pedestals, installation of the filter cartridge can be accomplished quickly and easily. If the pockets do not correspond, an immediate indication is provided that an attempt is being made to install an incorrect filter cartridge. This feature allows a filter manufacturer to customize housing seats to accommodate only correct filter cartridges (e.g., with the appropriate micron rating), and thereby insure that the correct filter cartridges are installed in the field. In this manner, problems that could occur due to incorrect filter installation (e.g., plugging, corrosion, delivery or consumption of inadequately pure fluid, etc.) are averted before they happen.

DRAWINGS

DESCRIPTION

Figure 1A:
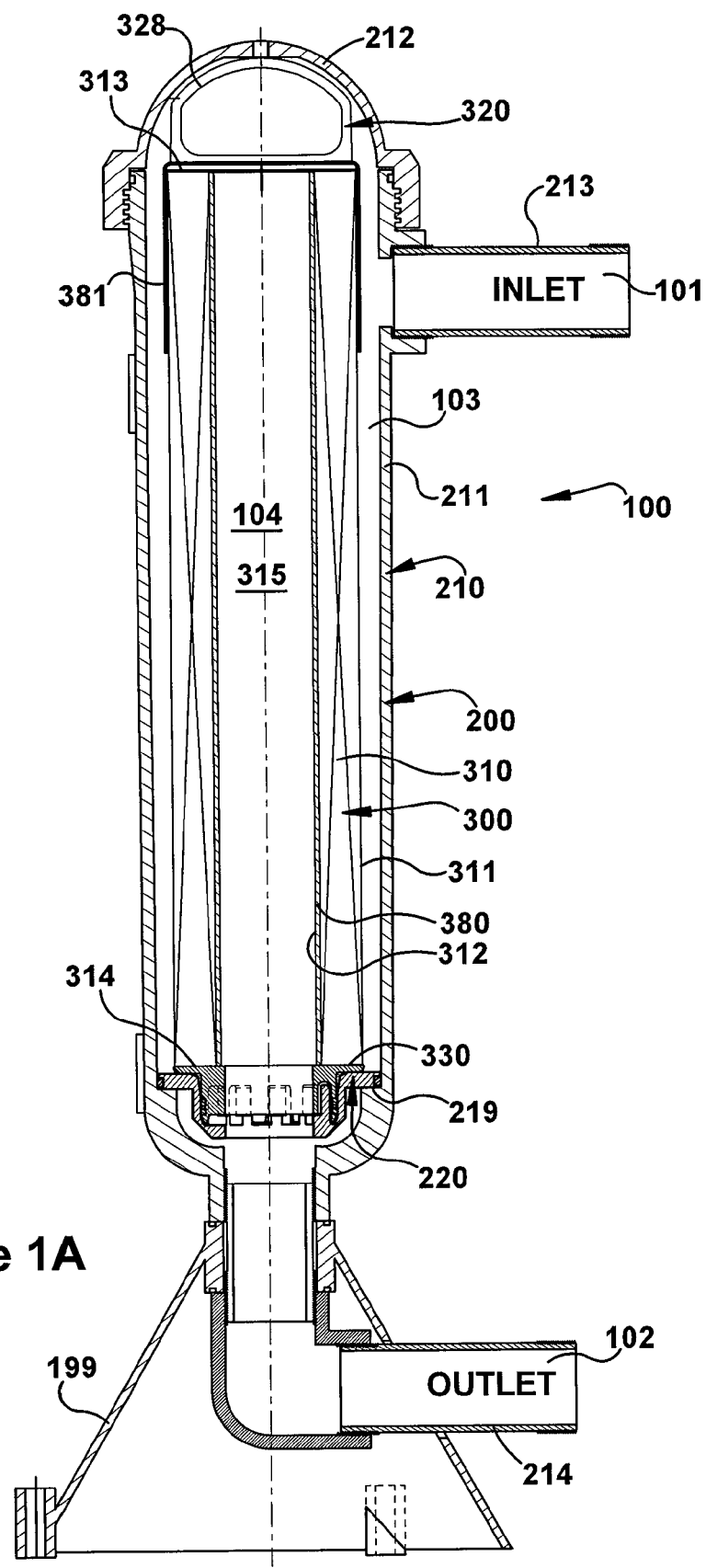
FIGS. 1A-1C are various views of a filter assembly.

Referring now to the drawings, and initially to FIG. 1A, a filter assembly 100 comprises a housing 200 and a filter cartridge 300. The housing 200 and the cartridge 300 define an inlet port 101, an outlet port 102, an inlet chamber 103 communicating with the inlet port 101, and an outlet chamber 104 communicating with the outlet port 102. The inlet chamber 103 is situated in the space between the filter cartridge 300 and the housing 200, and the outlet chamber 104 is situated within the filter cartridge 300. The inlet/outlet modifiers of the ports 101/102 and the chambers 103/104 correspond to a radially-inward flow path of the to-be-filtered fluid. With radially-outward fluid flow, the roles of the ports/chambers would be reversed.

The housing 200 is usually considered a permanent part of the filter assembly 100, whereby it can be mounted, braced, are otherwise fixed at the filtering site. For example, in the illustrated embodiment, the housing 200 is mounted on a stand 199. The housing 200 typically remains in one location throughout the life of the filter assembly 100, with filter cartridges 300 being carried thereto for periodic replacements.

In the illustrated embodiment, the housing 200 comprises a capsule 210 including a sleeve 211 and a lid 212. The lid 212 can be removably attached to the sleeve's top edge by, for example, a threaded interface therebetween. The inlet port 101 is formed by a hose 213 extending radially from an opening in the sleeve's circumferential wall. The outlet port 102 is formed by a hose 214 extending downward from an opening in the bottom wall of the sleeve 211.

Figure 1B:
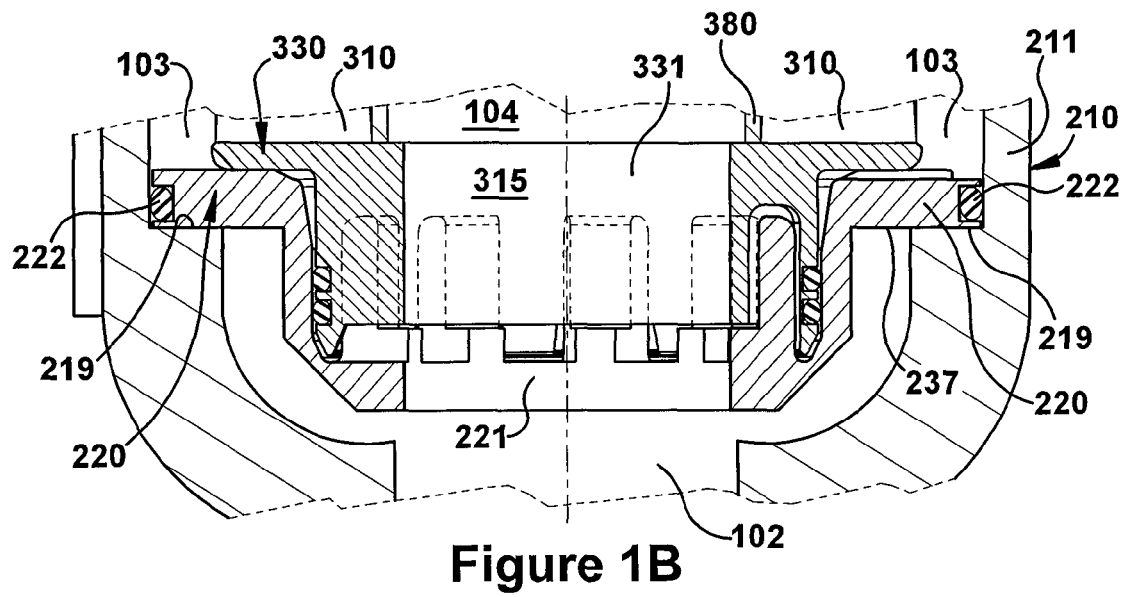
Figure 1C:
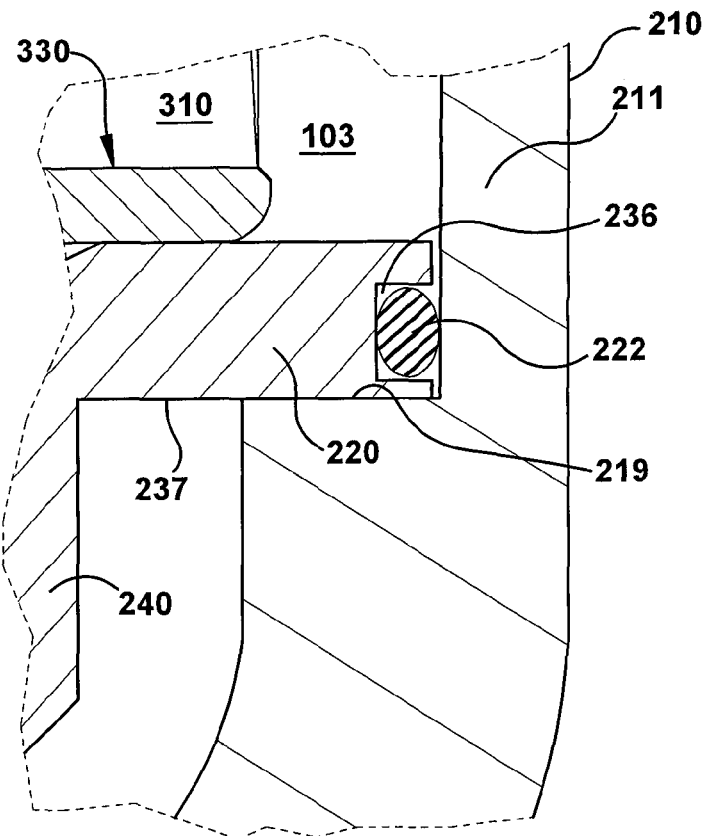
Figure 2A:
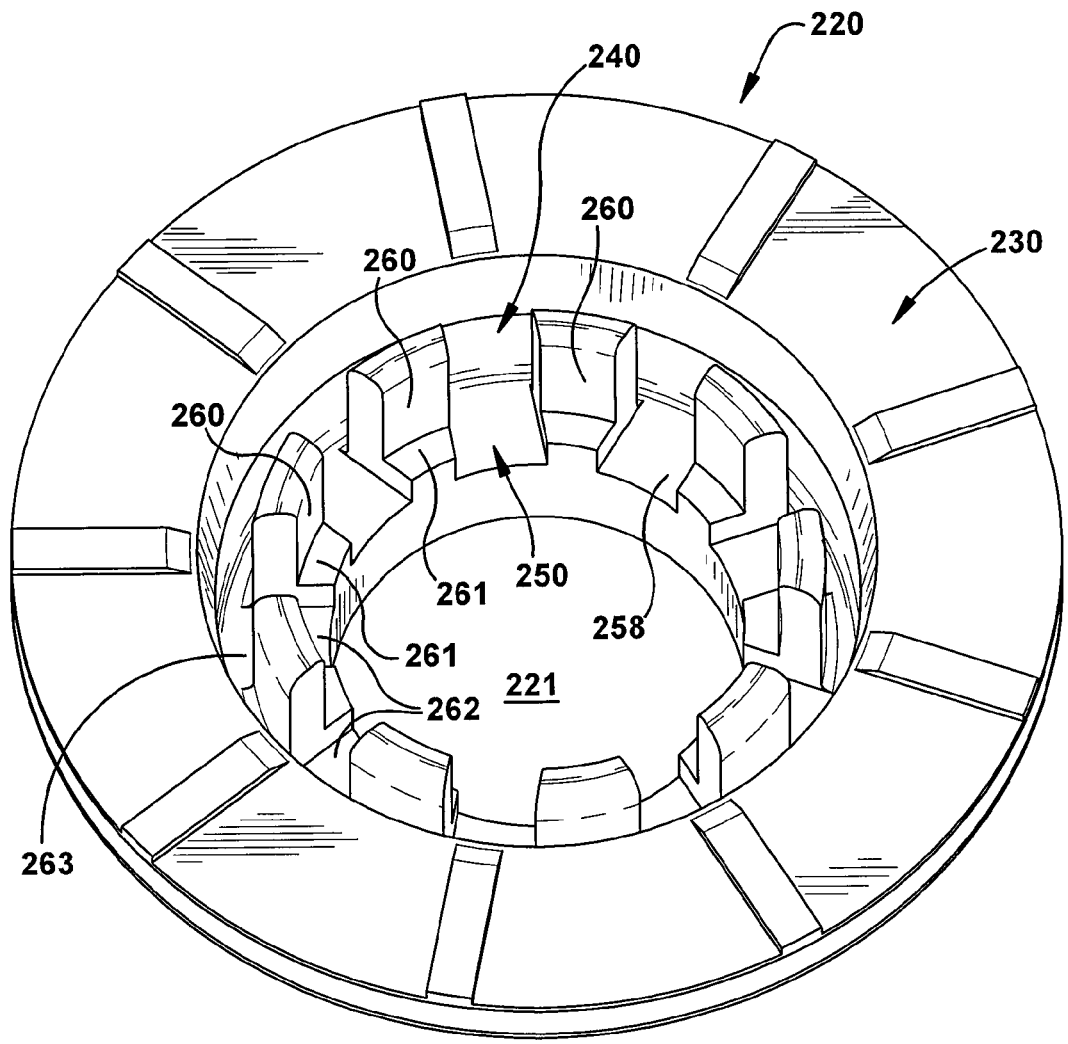
FIGS. 2A-2F are various views of a seat in the housing of the filter assembly.
Figure 2B:
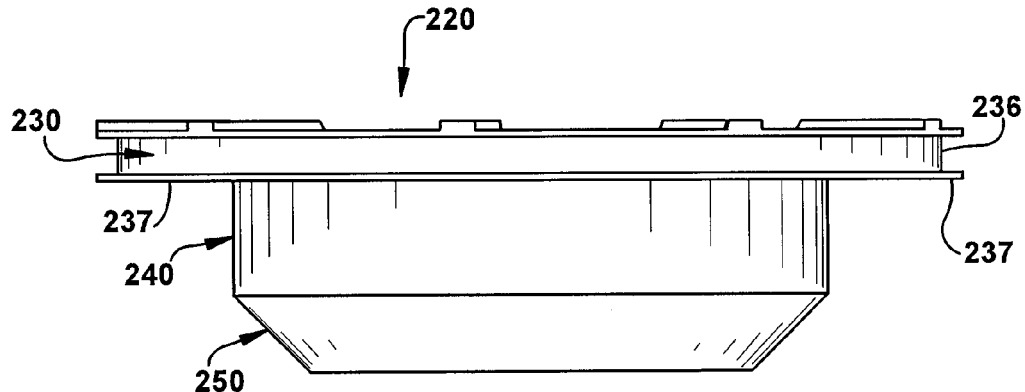
Figure 2C:
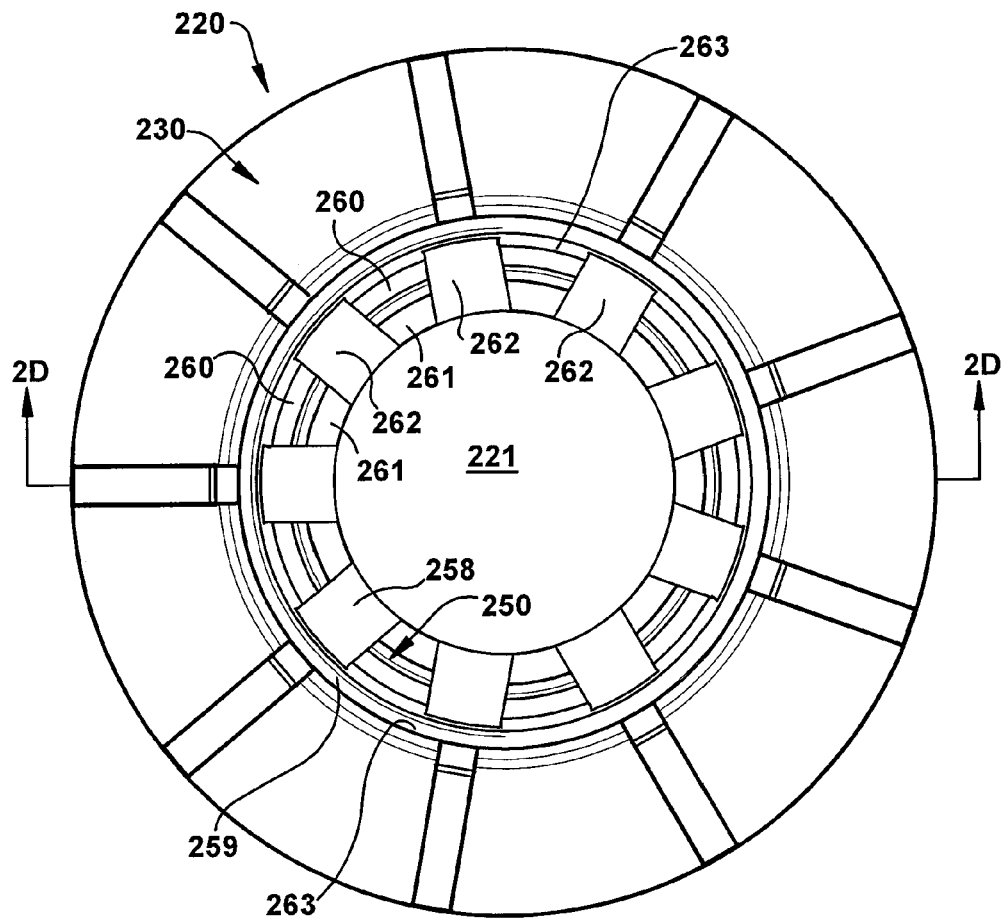
Figure 2D:
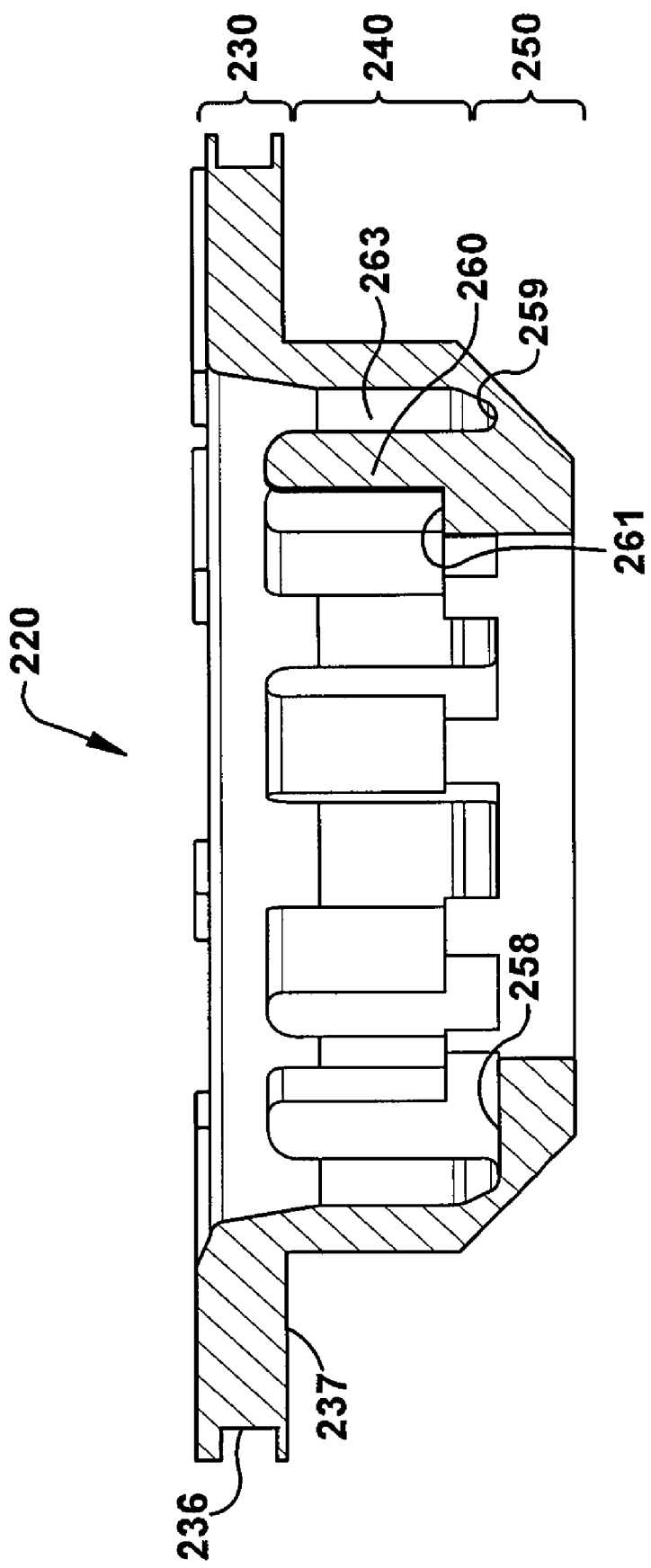
Figure 2E:
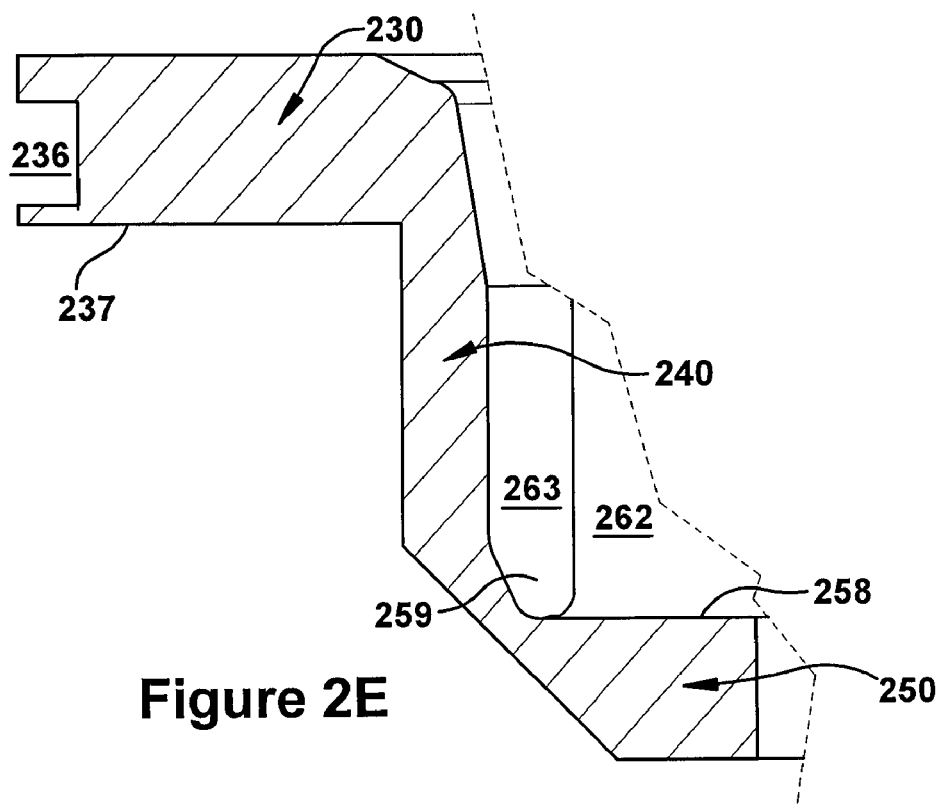
Figure 2F:
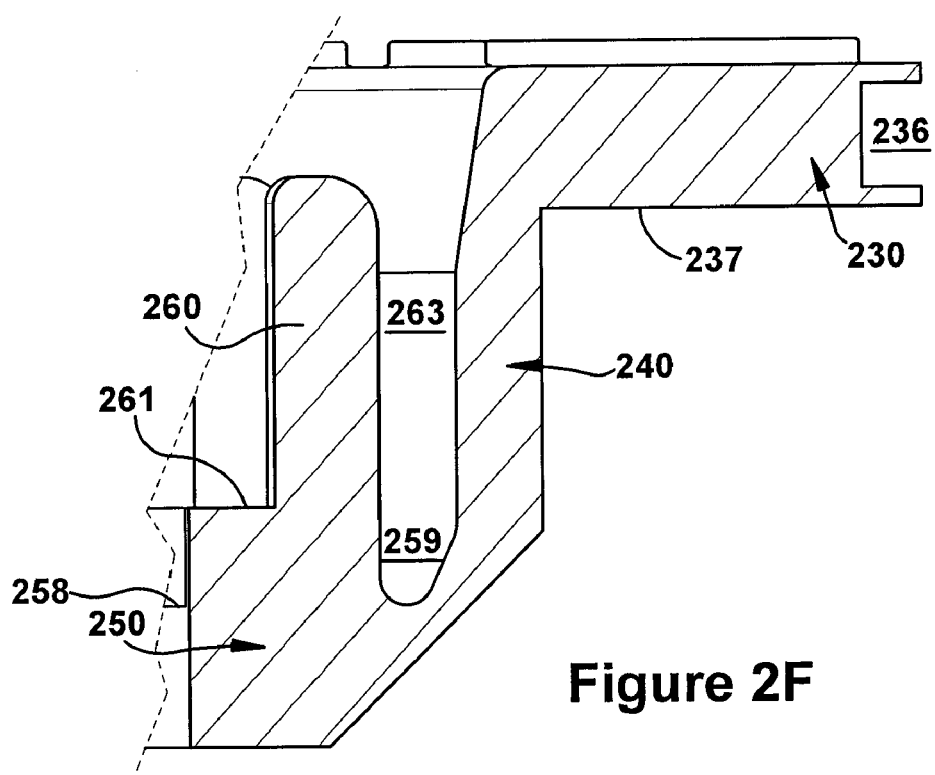
Figure 3A:
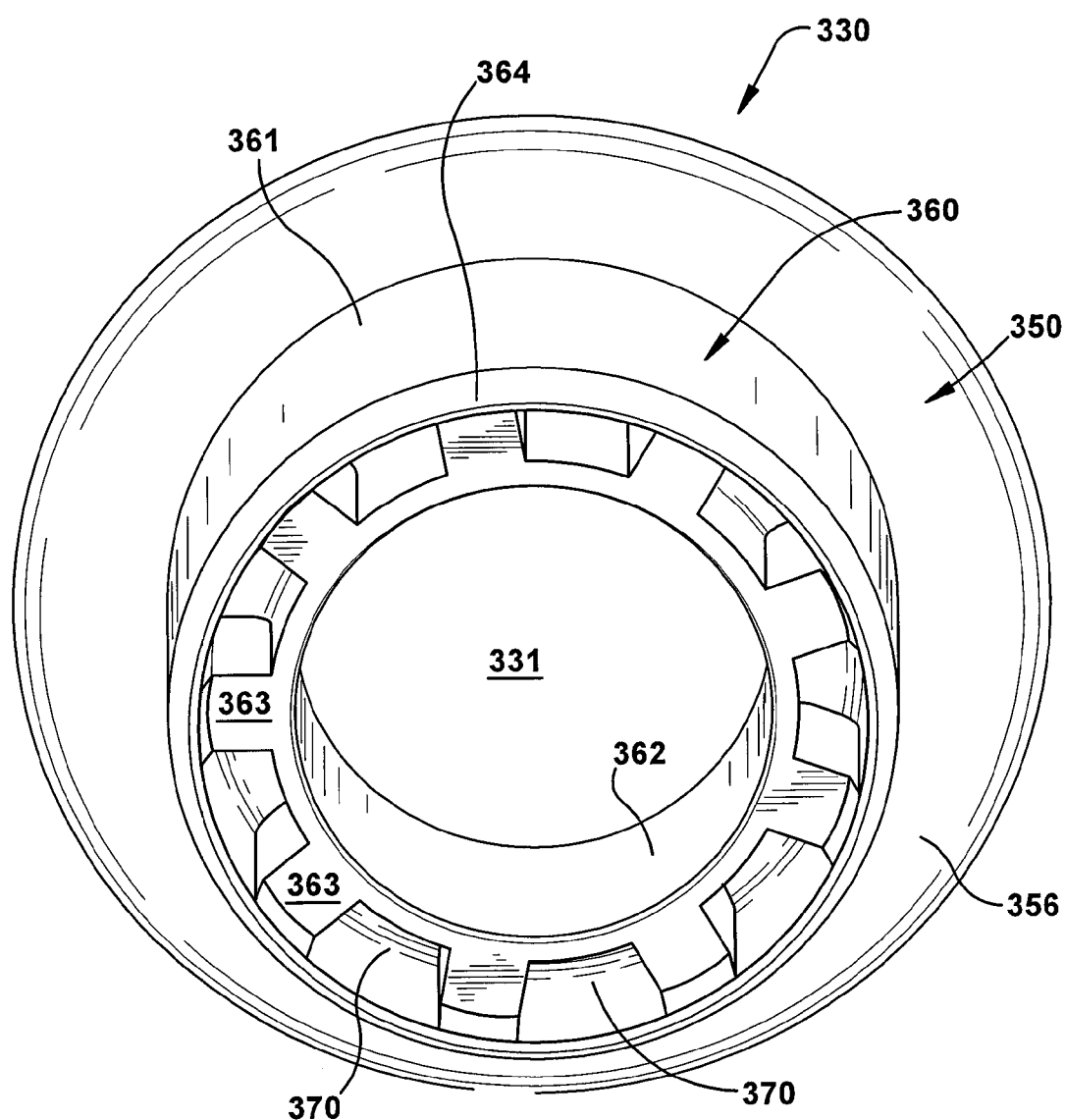
FIGS. 3A-3F are various views of an end cap in the filter cartridge of the filter assembly.
Figure 3B:
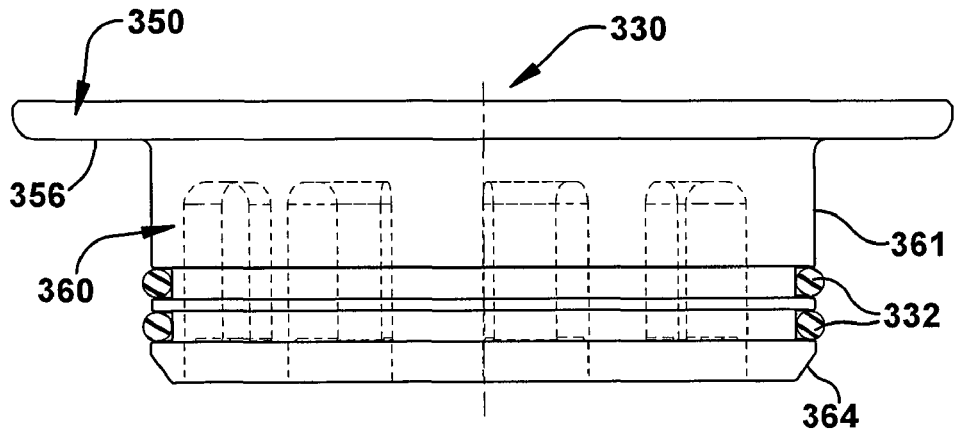
Figure 3C:
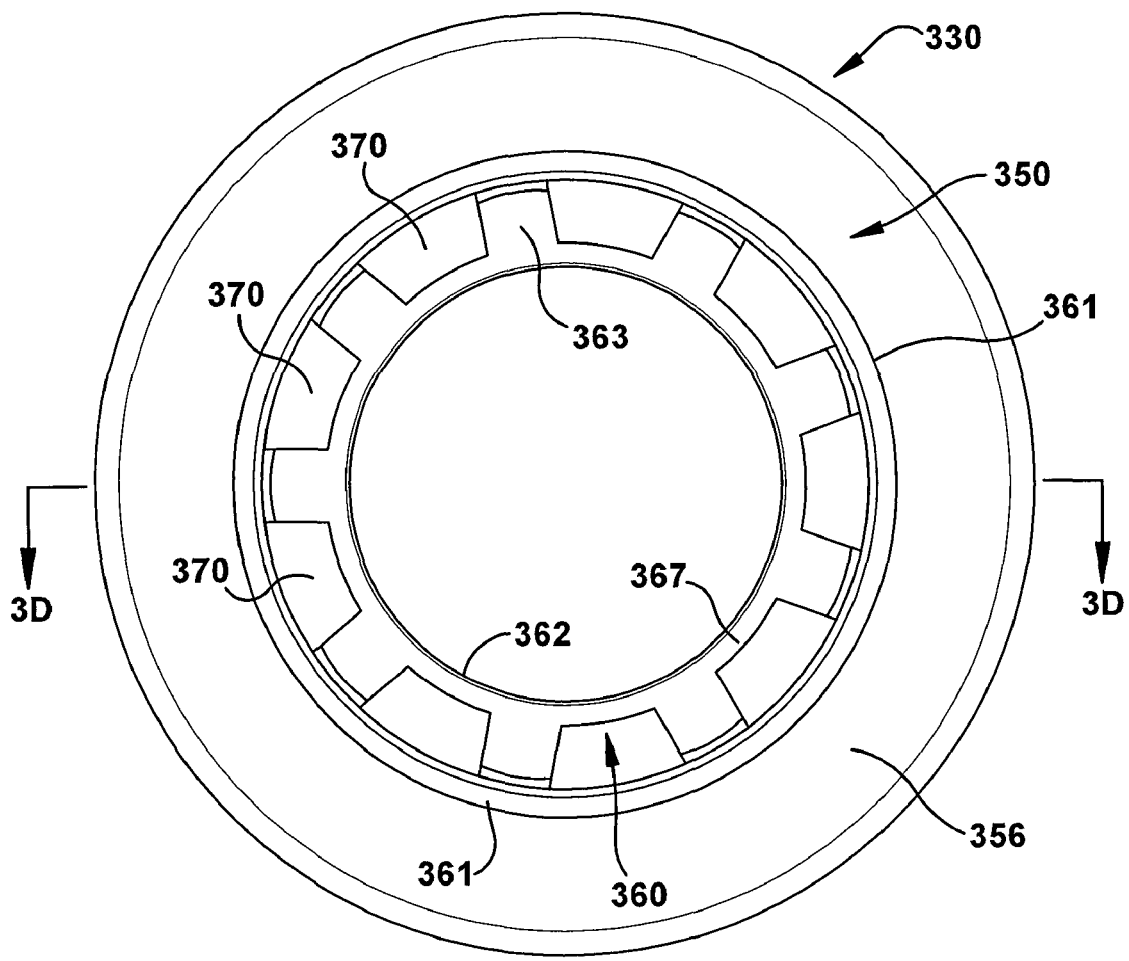
Figure 3D:
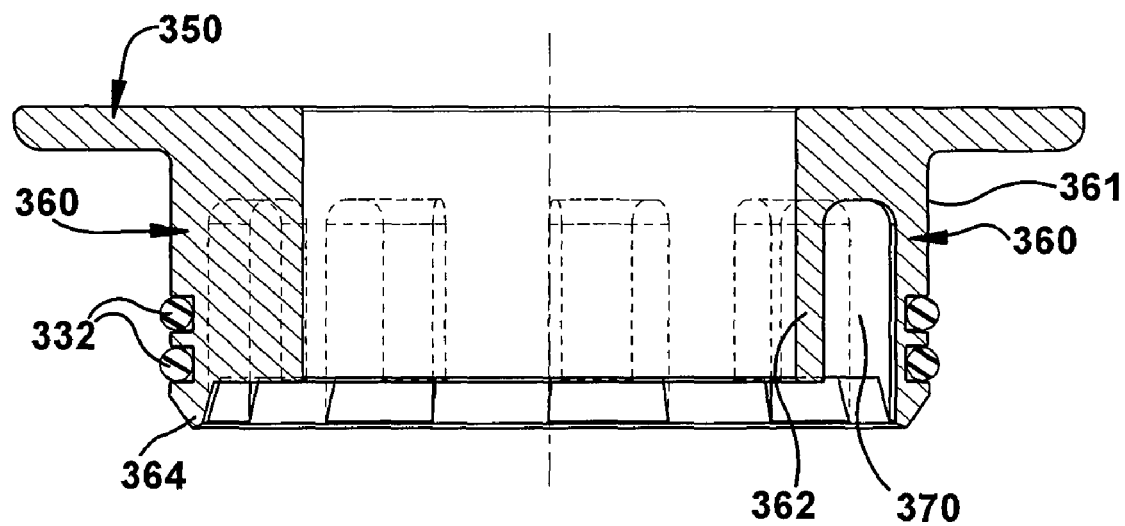
Figure 3E:
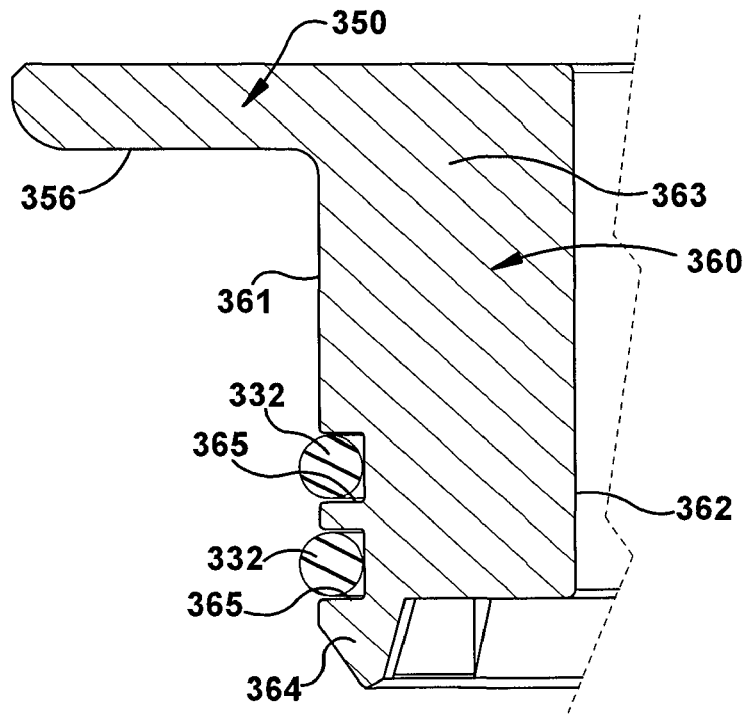
Figure 3F:
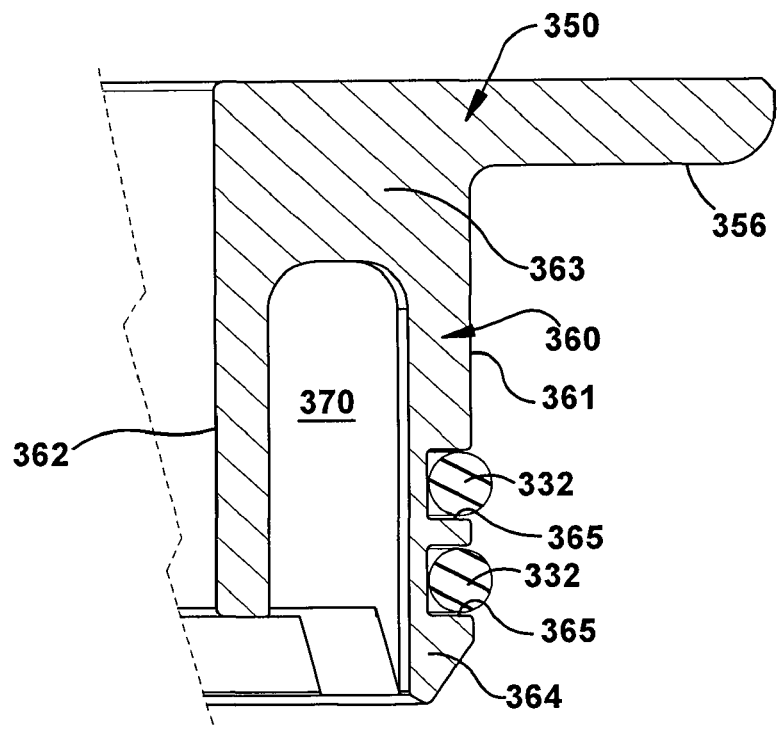

Referring additionally to FIGS. 1B and 1C, the housing 200 can further comprise an internal shelf 219 and a seat 220 that is mounted on the shelf 219. The seat 220 can be, as illustrated, formed separately from the sleeve 211. The advantage of such separateness is that it allows a filter manufacturer to stock a standard capsule 210 and then customize it with a particular seat 220 corresponding to the intended filter cartridge 300. That being said, the seat 220 could be formed in one piece with the sleeve 211, in which case the shelf 219 may not be necessary.

The filter cartridge 300 can comprise a filtration media 310, a first end cap 320, a second end cap 330, and a center tube 380. The illustrated filtration media 310 is complied into a cylindrical pack having a radially outer face 311, a radially inner face 312, a first axial face 313, and a second axial face 314. The radially inner face 312 defines a center bore 315 that encompasses the chamber 104.

The media 310 can be formed from, for example, one or more layers of filtering material folded into pleats and then circled into a cylindrical shape. The pleats' radially-outer peaks would form the media's radially outer face 311. And the pleats' radially-inner peaks would form the media's radially inner face 312.

The first end cap 320 is attached to, and seals, the first axial face 313 of the filter media 310. In the illustrated cartridge 300, the first end cap 320 also seals or otherwise closes the adjacent end of the inner fluid chamber 104. The end cap 320 can have a conventional construction, with the exception of having a handle 328 attached thereto. In the illustrated embodiment, the handle 328 will extend beyond the open end of the sleeve 211 when the lid 212 is removed.

The second end cap 330 is attached to, and seals, the second axial face 314 of the filter cartridge 300. But it does not seal the adjacent axial end of the fluid chamber 103. As is explained in more detail below, the end cap 330 is adapted to mate with the seat 220 for installation of the filter cartridge 300 in the housing 200.

The center tube 380 is situated within the inner radial face 312 of the filter media 310 and extends from its first axial face 313 to its second axial face 314. The tube 380 and/or the filter cartridge 300 can further include an outer shield 381 surrounding the outer radial face 311 of the filtration media 310, adjacent the inlet port 101. The tube 380 and/or the shield 381 can be perforated or otherwise porous to allow the flow of fluid therethrough.

The housing seat 220 is shown isolated from the rest of the capsule 210 in FIGS. 2A-2E. The seat 220 has a central passage 221 that, in the filter assembly 100, communicates with the outlet port 102 and the inner chamber 104. A seal 222 (e.g., an elastomeric O-ring) prevents fluid in the outer chamber 103 from sneaking past the seat 220 and traveling to the outlet port 102 without passing through the filter cartridge 300.

The seat 220 can comprise a rim 230, a hem 240, and a base 250 that are preferably formed in one piece (e.g., molded from a polymeric material). The radially inner surfaces of the rim 230, the hem 240, and the base 250 together form the central passage 221. The rim 230 can include a groove 236 on its outer radial surface for receipt of the seal 222. The rim 230 can also form a ledge 237 surrounding the hem 240. In the filter assembly 100, the ledge 237 rests upon the housing shelf 219, with the seal 222 pressed against the adjacent interior surface region of the capsule 210. (See FIGS. 1B and 1C.)

The base 250 forms a platform 258 inside the hem 240 and a family of pedestals 260 extends axially from the platform 258 towards the rim 230. The pedestals 260 function as axial keys that will mate with the correct filter cartridge 300 (and will not mate with an incorrect filter cartridge 300). Thus, the pedestals 260 are sized, shaped, spaced, and situated to correspond to the intended filter cartridge 300 (and more particularly, its pockets 370, introduced below). A filter manufacturer would, for example, develop several unique pedestal families, with one family corresponding to each of its filter-cartridge offerings.

The illustrated housing seat 220 has a family of nine similar pedestals 260 spaced evenly around the platform 258. The pedestals 260 are each roughly rectangular in axial section with a rounded distal edge. They can have approximately the same axial height which, in the illustrated embodiment, extends just past the hem 240. Other pedestal families could have, for example, more or less pedestals 260, varied pedestal sizes/shapes, and/or unevenly spaced pedestals 260.

The housing seat 220 can also in include skirt-supporting steps 261, pedestal-separating alleys 262, and/or an apron cradle 263. For example, a skirt-supporting step 261 can be attached to, and extend radially inward from, each pedestal 260 to the base's radially inner side. The alleys 262 can extend radially through each circumferentially adjacent pair of pedestals 260 (and their attached steps 261) in a spoke-like manner. The apron cradle 263 can be formed by the annular space radially surrounding the pedestals 260 and it can axially extend into a groove 259 in the platform 258.

The second end cap 330 is shown isolated from the rest of the filter cartridge 300 in FIGS. 3A-3E. The end cap 330 has a central passage 331 extending therethrough. In the filter assembly 100, the central passage 331 communicates with the outlet port 102, the inner chamber 104, and the seat's central passage 221. One or more seals 332 are provided to seal the central passage 331 from the inlet chamber 103.

The second end cap 330 comprises a brim portion 350 and a crown portion 360 that are preferably formed in one piece (e.g., molded from a plastic material). The axial end of the brim portion 350 is bonded or otherwise sealed to the second axial face 314 of the filtration media 310, and it forms a ledge 356 surrounding the crown portion 360. The radially inner surface of the brim portion 350 and the radially inner surface of the crown portion 360 define the cap's central passage 331.

The end cap 330 further comprises a family pockets 370 opening into the axial end of the crown portion 360. The pockets 370 are shaped, sized, and situated for insertion of the keyed pedestals 260 of the housing seat 220. Thus, in correspondence with the illustrated seat 220, for example, the end cap 330 has nine evenly spaced pockets 370, each having a roughly rectangular (in axial section) shape with a rounded floor.

If a filter manufacturer has several unique pedestal families, each corresponding filter cartridge 300 would have a unique complementary family of pockets 370. The end cap 330 could have, for example, at least two key-insertion pockets 370, at least four key-insertion pockets 370, and/or at least eight key-insertion pockets 370. The pockets 370 could be of the same or different sizes/shapes, and/or the pockets 370 could be evenly or unevenly spaced from one another.

The crown portion 360 of the illustrated end cap 330 comprises a radially-outer apron 361, a radially-inner skirt 362, and pocket-separating bridges 363 extending radially therebetween. The pockets 370 can be situated radially between the apron 361 and the skirt 362, with the pocket-separating bridges 363 located between each pair of circumferentially adjacent pockets 370. The apron 361, the skirt 362, and the bridges 363 can be formed in one piece (e.g., molded from a polymeric material), with the pockets 370 being defined by the voids thereamong.

The apron 361 can extend axially beyond the skirt 362 (and the bridges 364) and its distal tip 364 can have a ramped contour. The skirt 362 and the bridges 373 can have the same axial dimension so as to thereby together form a level surface around the pockets 370. The pockets' depth can extend the axial height of the crown portion 360 or, as illustrated, can stop short thereof.

The radially outer side of the crown portion 360 has at least one circumferential groove 365 for receipt of the seal 332. The illustrated end cap 330 has a pair of grooves 365 and a seal 332 positioned in each groove. The end cap 330 and/or the crown portion 360 could instead have an integrally formed seal(s) 332 in which case the groove(s) may not be necessary.

Figure 4A:
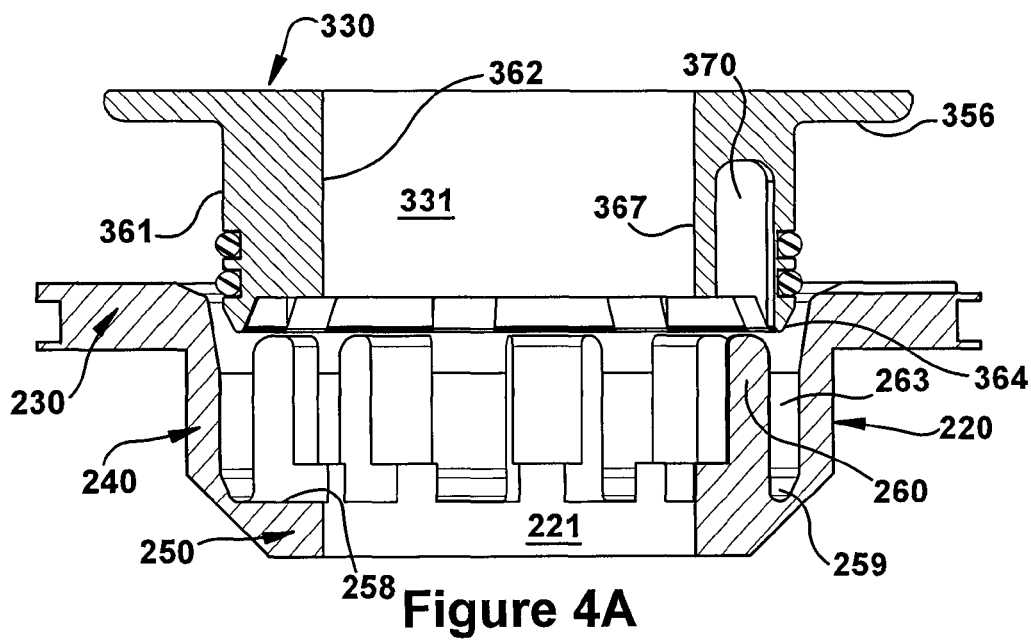
FIGS. 4A-4C are sectional views showing the interaction between the housing seat and the end cap when the filter cartridge is installed.
Figure 4B:
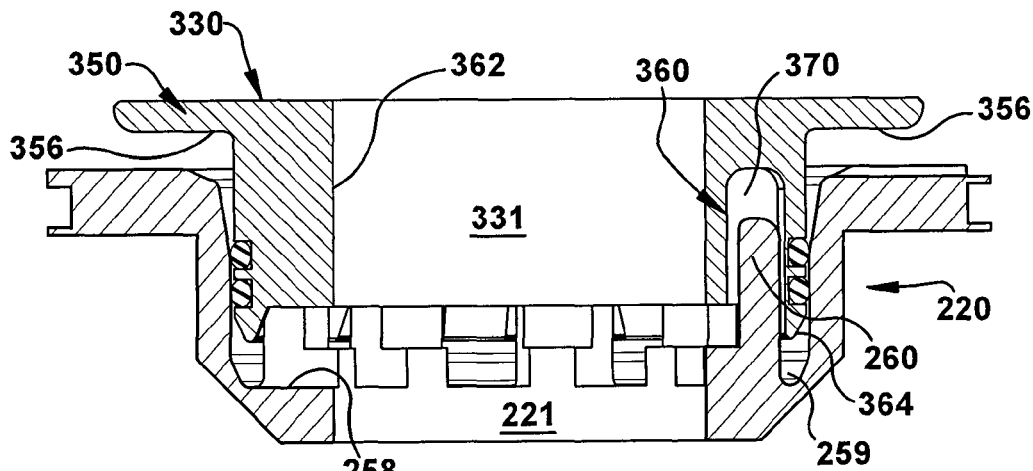
Figure 4C:
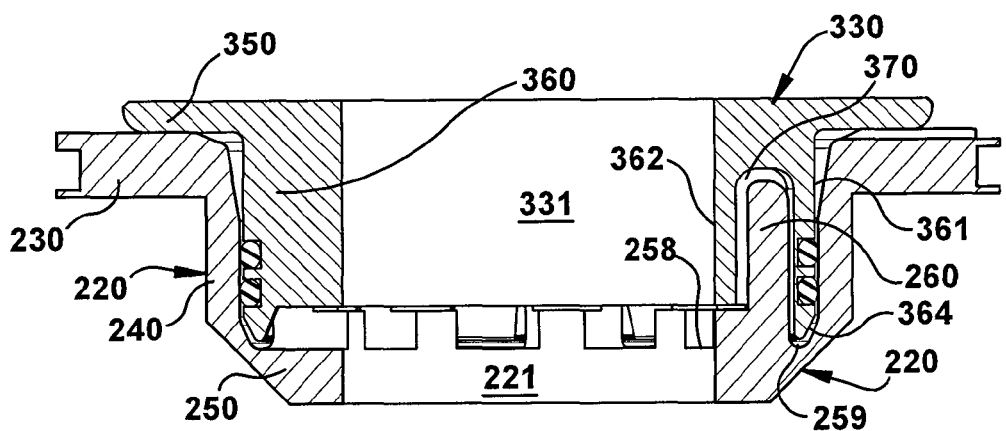

Referring now to FIGS. 4A-4C, the cartridge-installation cooperation between the end cap 330 and the housing seat 220 is shown. In these figures, the seat 220 is shown disassembled from the housing 200 and the end cap 330 is shown without the rest of the filter cartridge 300. This would not be the case in an actual cartridge installation, as the seat 220 would have been previously mounted within the capsule 210 and the filter cartridge 300 would be installed as an integral unit.

An initial cartridge-installation step is the opening of the housing 200 to allow access to its seat 220. In the illustrated capsule 210, for example, the lid 212 would be unscrewed and removed, thereby exposing the handle 328 of the previously installed, and to be replaced, filter cartridge 300. The "old" filter cartridge 300 is then moved axially away from the housing seat 220. In the illustrated orientation, for example, the handle 328 on the top cap 320 is pulled upward.

The replacement filter cartridge 300 is then inserted into the capsule 210 so that its end cap 330 can be positioned axially adjacent to the housing seat 220. The cap's pockets are 370 are aligned with the seat's pedestals 260 and the filter cartridge 300 is pushed axially toward the seat 220 until the pedestals 260 are fully inserted into the pockets 370. The central passage 332 of the end cap 330 communicates with the seat's passage 222, and thus also communicates with the outlet port 102 and the inner chamber 104. The seals 332 will be positioned to seal the interface between seat's hem portion 240 and the cap's crown portion 360.

The illustrated filter cartridge 300, and particularly its end cap 330, has certain features that may facilitate the installation process. For example, the apron 361 is axially taller than the skirt 362 and/or the pocket-dividing walls 363 (as illustrated). This tallness allows the apron 361 to be partially inserted into the housing seat 220 without pocket-pedestal alignment. More particularly, the apron tip 364 can be slipped into the platform cradle 263 up to skirt level. The ramped receiving surface of the housing seat 220 (e.g., the radially inner side of the hem portion 240) and the tapered contour of the apron tip 364 can facilitate this preliminary insertion.

Upon initial apron-tip insertion, the non-yet-aligned pedestals 260 in the housing seat 220 will contact the level surface on the end cap 330 formed by the pocket-separating bridges 363. The filter cartridge 300 can then be rotated clockwise or counterclockwise (either direction will work), with the cradle-captured apron tip 364 confining this orbit to the required circular path. The pedestals 260 will eventually "meet" the pockets 370 and be inserted therein. Axial movement can then be completed to insure full pocket insertion, so that the cap's ledge 356 rests on the exposed axial side of the seat 220, and the apron tip 364 is received within the seat's platform groove 259.

Thus, pocket-pedestal alignment can be accomplished "blindly" without requiring initial housing receipt of the filter cartridge at any particular angle. The handle 328 on the first end cap 320, and/or its projection beyond the sleeve 211 when the housing 200 is opened, can add convenience and ease to cartridge-installation steps.

The symmetry of the pedestal-pocket arrangement and the number of pedestals/pockets 270/370 can limit the circular orbit necessary to achieve pedestal-pocket alignment. For example, in the illustrated embodiment, several pedestals 270 and the pockets 370 are symmetrically arranged, whereby, at most, a relatively short rotational orbit (e.g., less than 40°) will be necessary. More symmetrically-arranged pedestal/pockets could result in a shorter rotational path; less symmetrically-arranged pedestal/pockets could require a longer rotational path. And non-symmetrical arrangements (even those that could potentially require an almost 360° rotational path) are possible and contemplated, and would probably not be all that inconvenient.

If the seat's pedestals 260 correspond to the end cap's pockets 370, the filter cartridge 300 can be easily and quickly installed in the housing 200. However, if an incorrect filter cartridge is used, it will be immediately apparent that there is no pocket-pedestal correspondence. Steps can then be taken to return the incorrect cartridge to inventory and secure the correct cartridge.

Although the filter assembly 100, the housing 200, the seat 220, the filter cartridge 300, and/or the end cap 330 have been shown and described with respect to certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

The invention claimed is:

1. A filter cartridge for installation in a housing having a housing seat with a particular keyed pattern of axially projecting pedestals; wherein:
    the filter cartridge includes a filtration media compiled in a cylindrical pack having a radially outer face, a radially inner face defining a central bore, a first axial end face, and a second axial end face;
    the filter cartridge also including an end cap comprising a brim portion, a crown portion, and pockets that open into an axial side of the crown portion;
    the second axial face of the filtration media is bonded and sealed to an axial end of the brim portion;
    radially inner surfaces of the brim portion and the crown portion form a central passage that communicates with the central bore of the filtration media; and
    the pockets are shaped, sized, and situated for full insertion of the pedestals in the housing seat,
    wherein the crown portion includes a radially outer apron radially outwardly disposed with respect to the central passage of the crown portion, and wherein the pedestal-insertion pockets are located radially inwardly of the apron and the apron has a radially outwardly facing groove, and a seal is disposed in the groove for sealing the end cap to the housing seat.

2. A filter cartridge as set forth in claim 1, further comprising another end cap having an axial side bonded and sealed to the first axial face of the filtration media.

3. A filter cartridge as set forth in claim 2, and wherein the end cap sealed to the first axial face of the filtration media has a handle attached thereto.

4. A filter cartridge as set forth in claim 1, wherein the brim portion and the crown portion of the end cap are formed in one piece.

5. A filter cartridge as set forth in claim 1, wherein the brim portion forms a radial ledge around the crown portion.

6. A filter cartridge as set forth in claim 1, wherein the crown portion includes a radially inner skirt, and wherein the pedestal-insertion pockets are located radially between the apron and the skirt.

7. A filter cartridge as set forth in claim 6, wherein the apron is axially taller than the skirt.

8. A filter cartridge as set forth in claim 6, wherein the crown portion further includes pocket-separating bridges between circumferentially adjacent pedestal-insertion pockets.

9. A filter cartridge as set forth in claim 8, wherein the pocket-separating bridges span radially between the apron and the skirt, and have the same axial height as the skirt.

10. A filter cartridge as set forth in claim 8, wherein the apron, the skirt, and the pocket-separating bridges are formed in one piece.

11. A filter cartridge as set forth in claim 1, wherein the end cap includes at least two pedestal-insertion pockets.

12. A filter cartridge as set forth in claim 1, wherein the end cap includes at least four pedestal-insertion pockets.

13. A filter cartridge as set forth in claim 1, wherein the end cap includes at least eight pedestal-insertion pockets.

14. A filter cartridge as set forth in claim 1, wherein circumferentially adjacent pedestal-insertion pockets are spaced substantially equally from each other.

15. A filter cartridge as set forth in claim 1, wherein the brim portion and the crown portion of the end cap are formed in one piece;
    wherein the crown portion includes a radially outer apron, a radially inner skirt, and pocket-separating bridges extending radially therebetween; and
    wherein the end cap includes at least four pedestal-insertion pockets.

16. A filter cartridge as set forth in claim 1 and a housing seat with a particular keyed pattern of axially projecting pedestals, and wherein these keys are inserted into the pockets of the end cap of the filter cartridge.

17. A filter cartridge as set forth in claim 1 and a housing having a seat with a particular keyed pattern of axially projecting pedestals, and wherein these keys are inserted into the pockets of the end cap of the filter cartridge.

18. A filter element comprising a housing and a filter cartridge installed in the housing;
- the housing having a seat with a particular keyed pattern of axially projecting pedestals;
- the filter cartridge including a filtration media and an end cap bonded to an axial face of the filtration media;
- the end cap comprising pockets that are shaped, sized, and situated in correspondence with the pedestals on the housing's seat; and wherein the pedestals are inserted into the pockets, and wherein the end cap includes a crown portion including an apron radially outwardly disposed with respect to a central passage of the crown portion, and wherein the pockets are located radially inwardly of the apron and the apron has a radially outwardly facing groove, and a seal is disposed in the groove for sealing the end cap to the seat.

* * * * *